United States Patent
Persson et al.

(10) Patent No.: US 10,033,653 B2
(45) Date of Patent: Jul. 24, 2018

(54) CONTROLLING A TRANSMISSION CONTROL PROTOCOL CONGESTION WINDOW SIZE

(71) Applicant: Telefonaktiebolaget LM Ericsson (publ), Stockholm (SE)

(72) Inventors: Fredrik Persson, Märsta (SE); Lars G Englund, Sollentuna (SE); Tomas Nylander, Värmdö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

(21) Appl. No.: 15/035,361

(22) PCT Filed: Nov. 26, 2013

(86) PCT No.: PCT/EP2013/074782
§ 371 (c)(1),
(2) Date: May 9, 2016

(87) PCT Pub. No.: WO2015/078491
PCT Pub. Date: Jun. 4, 2015

(65) Prior Publication Data
US 2016/0294714 A1 Oct. 6, 2016

(51) Int. Cl.
*H04L 12/807* (2013.01)
*H04L 12/801* (2013.01)
*H04L 12/825* (2013.01)
*H04L 12/859* (2013.01)

(52) U.S. Cl.
CPC ............. *H04L 47/27* (2013.01); *H04L 47/12* (2013.01); *H04L 47/193* (2013.01); *H04L 47/25* (2013.01); *H04L 47/14* (2013.01); *H04L 47/2475* (2013.01)

(58) Field of Classification Search
CPC ....... H04L 47/27; H04L 47/193; H04L 47/12; H04L 47/25; H04N 7/173
See application file for complete search history.

(56) References Cited

U.S. PATENT DOCUMENTS

| | | | |
|---|---|---|---|
| 2004/0066746 A1* | 4/2004 | Matsunaga | H04L 47/10 370/235 |
| 2008/0089250 A1* | 4/2008 | Jung | H04L 1/0028 370/276 |
| 2010/0246398 A1 | 9/2010 | Chiang | |
| 2011/0296485 A1* | 12/2011 | Nilsson | H04L 12/5695 725/114 |

FOREIGN PATENT DOCUMENTS

WO 2006058211 A2 6/2006

\* cited by examiner

*Primary Examiner* — Wei Zhao
(74) *Attorney, Agent, or Firm* — Coats & Bennett, PLLC (57) ABSTRACT

To control a TCP congestion window size for data sent from a TCP sending node in a communications network towards a TCP receiving node via a Radio Access Network, the TCP sending node determines a minimum required bit rate for a data stream sent towards the TCP receiving node. It then determines that a sending bit rate of the data stream must be reduced using a TCP congestion avoidance mechanism. When the congestion avoidance mechanism is applied, the congestion window size is adjusted such that the sending bit rate is no lower than the minimum required bit rate.

16 Claims, 4 Drawing Sheets

---

S1. Determine minimum bit rate for TCP data stream

S2. TCP congestion avoidance mechanism required

S3. Adjust window size so sending bit rate does not go below minimum required bit rate

CONTROLLING A TRANSMISSION CONTROL PROTOCOL CONGESTION WINDOW SIZE

FIELD OF THE INVENTION

The invention relates to the field of controlling a congestion window size rate using Transmission Control Protocol.

BACKGROUND TO THE INVENTION

The Transmission Control Protocol (TCP) is one of the most commonly used transport protocols in IP-based communication networks, such as the Internet. TCP provides reliability on top of the unreliable IP protocol, in-order delivery of data and a network congestion control mechanism to be outlined later. TCP is the primary end-to-end transport layer protocol in the Internet for non-real time data including data arising from e.g., web browsing, file-downloading and e-mail applications. The TCP layer is above the IP layer, the link layer and the physical layer, and below the application layer.

TCP uses a sliding window protocol to control a rate of sent data. A TCP sending node's window defines what the sending node can send, and is based on a TCP receiving node's advertised or offered window (rwnd) and a congestion window (cwnd) calculated by the sending node in the congestion control algorithm. The size of the TCP sending node's window is defined as the minimum of the receiver window (rwnd) and the congestion window (cwnd).

Figure 1:
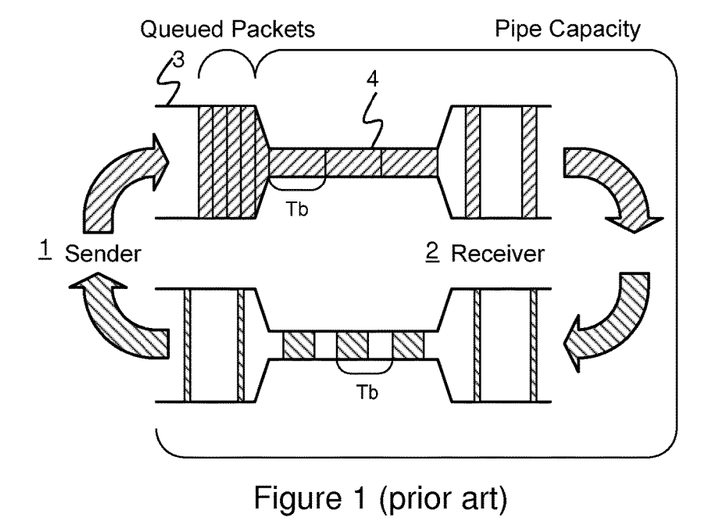
FIG. 1 illustrates schematically in a block diagram an example of TCP self-clocking.

When the TCP sending node receives an acknowledgement (ACK) from the TCP receiving node, it can transmit as many new segments as were acknowledged. The new segments move towards the TCP receiving node and they are later acknowledged. The spacing of the ACKs determines the rate at which new packets are sent. This property is known as self-clocking, an example of which is shown in FIG. 1. In this example, a TCP sending node 1 sends packets to a TCP receiving node 2, which sends acknowledgements. Congestion is caused by a bigger 'pipe' 3 at the sending node feeding a smaller 'pipe' 4 on the downlink to the TCP receiving node 2. The rate at which the packets flow through the downlink pipe 4 is also the rate at which the ACKs are sent back to the TCP sending node 1.

A TCP header is used to carry information about parameters such as window size, packet sequence number, acknowledgement number and so on. There are also options to enhance performance, e.g. a time stamp option giving a Round Trip Time (RTT) estimate, maximum segment size (MSS) and Selective Acknowledgements (SACK). Indications about use of options are in most cases only transmitted during the initial SYN and SYN/ACK phase of a 3-way-handshake performed to establish the TCP connection. The TCP ACKs sent from the TCP receiving node to the TCP sending node 1 contain no data but the header itself (20 bytes), and possible options (max 40 bytes).

An end-point in the network cannot know the true pipe capacity (PC) for the TCP connection; instead it has to probe the PC and to find the bottleneck rate. TCP uses three types of input to determine congestion; An ACK indicates that more bandwidth is available, if a packet is dropped it is indicative of light congestion, and if many packets are dropped or time out, it is indicative of serious congestion. TCP acts on these signals by changing the send window or by starting over with the initial settings (the slow-start mechanism).

Congestion control in TCP uses four main algorithms: slow-start, congestion avoidance, fast-retransmit and fast-recovery algorithms. The slow-start algorithm and the congestion avoidance algorithm are independent algorithms with different objectives, although in practice they are implemented together. The congestion avoidance algorithm probes for more bandwidth in a linear fashion by increasing the congestion window by 1/cwnd every time an ACK is received. The slow-start algorithm also increases the congestion window (cwnd) by one segment every time an ACK is received. This opens the congestion window exponentially until congestion is experienced. In this phase the behavior is very dependent on the RTT, and therefore improvements in end-to-end RTT have a big effect on end user performance, especially for short TCP connections. Many servers on the Internet currently apply an initial window size of three TCP segments, but larger sizes are being discussed.

The TCP send rate is therefore increased until reaching the maximum available throughput. The maximum TCP throughput is related to the RTT and the TCP receive window (rwnd) size, as shown in Equation 1 below.

$$TCP \text{ throughput} \leq \frac{TCP \text{ receive window}}{RTT} \quad \text{Eq. 1}$$

Equation 1 shows that the maximum TCP throughput increases if the RTT is reduced. It also indicates that the maximum TCP throughput can be reached more quickly if the congestion window size reaches a maximum more quickly.

Figure 2:
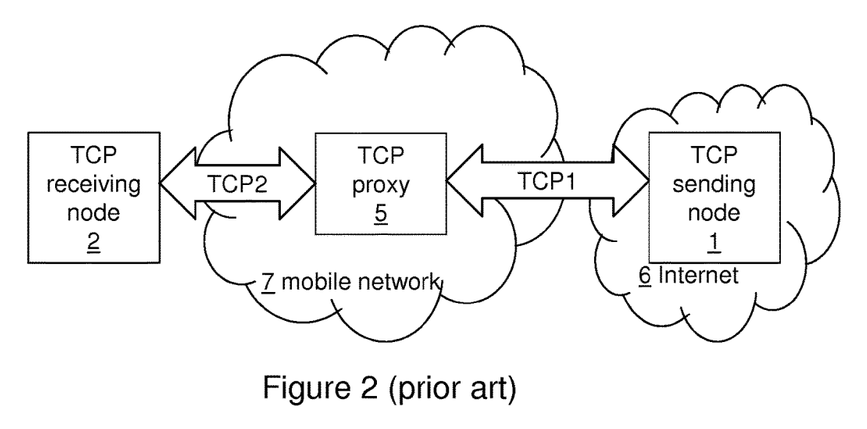
FIG. 2 illustrates schematically in a block diagram an exemplary network architecture where a TCP proxy is disposed between a TCP sending node and a TCP receiving node.

One quick way of accomplish this is to implement a TCP proxy 5 somewhere in between the TCP sending node 1 and the TCP receiving node 2, as illustrated in FIG. 2. The TCP sending node 1 in this example is a TCP server located in the Internet 6, and the TCP receiving node 2 is a mobile device such as a User Equipment (UE) attached to a mobile network 7. The TCP connection is split into two legs; TCP1 is established between the TCP sending node 1 and the TCP proxy 5, and terminates at the TCP proxy 5. Acknowledgements are transmitted back to the TCP sending node 1 from the TCP proxy 5. From the TCP proxy 5, another TCP connection, TCP2, is set up towards the TCP receiving node 2. Each TCP connection, TCP1 and TCP2, has its own flow control loop. This architecture is termed Split TCP, and reduces the RTT. The TCP proxy 5 may be located at one of several interfaces within or outside the mobile network. For example, in a Long Term Evolution (LTE) network, the TCP proxy 5 may be located at the SGi interface between a TCP Server and a Public Data Network Gateway (PGW).

It is possible to speed up TCP transmission by applying specific parameter settings or algorithms at the TCP server (where the server is the TCP sending node) side of the connection. This may also be achieved at the TCP proxy 5.

In the situation with or without a proxy, but where TCP packets are sent over a mobile network 7, a congestion avoidance mechanism may be initiated owing to congestion in the mobile network. It is difficult to make an informed decision as to how much to decrease the send window size in this case, as the loss of a packet may be caused by factors other than congestion, such as an isolated dropped packet in the RAN. For some services or use cases, such as sending audio or video data, the congestion avoidance mechanism can give a large negative impact. If the transmission rate backs off too much, or reverts to the initial window size, this can have a serious effect on the end-user's quality of experience (QoE). Furthermore, unnecessary backing off using the congestion avoidance mechanism can lead to underutilization of resources in the mobile network 7. Furthermore, some types of service (setting up short-duration TCP connections that do not always enter the TCP fast recovery phase, such as email or web browsing) are less affected by a congestion avoidance mechanism than streaming services such as audio or video (setting up longer-duration TCP connections, having specific requirements on latency and bit rate).

SUMMARY OF THE INVENTION

It is an object to improve an end-user's QoE when receiving data sent using TCP. This may, in part, be achieved by setting TCP parameters at a TCP sending node according to the type of data being sent. In legacy TCP sending nodes and proxies, a single parameter setting is used for all different services passing through the proxy, and the type of data (e.g. email, web traffic, video, audio etc.) is not taken into account.

According to a first aspect, there is provided a method of controlling a TCP congestion window size for data sent from a TCP sending node in a communications network towards a TCP receiving node via a Radio Access Network. The TCP sending node determines a minimum required bit rate for a data stream sent towards the TCP receiving node. It then determines that a sending bit rate of the data stream must be reduced using a TCP congestion avoidance mechanism. When the congestion avoidance mechanism is applied, the congestion window size is adjusted such that the sending bit rate is no lower than the minimum required bit rate.

An advantage of this is that the TCP receiving node does not receive a TCP data stream at a bit rate that falls below a desired level, thereby maintaining an end-user's QoE.

As an option, the minimum required bit rate is determined on the basis of the type of data. This allows, for example, a minimum required bit rate to be set at a higher level for streaming video data than for web browsing.

The type of data is optionally determined by performing a packet inspection on a data packet. There are different types and levels of packet inspection, any of which can be used either alone or in combination. Examples of packet inspection include header classification, shallow inspection, deep packet inspection and heuristic analysis.

As an option, the TCP sending node receives from a network analysis node a message, the message including the minimum required bit rate.

As an option, the TCP sending node sends a further message towards a node in the Radio Access Network. The further message includes any of the minimum required bit rate for the data stream, the reduced bit rate for the media stream, and a predicted bit rate for the data stream. An advantage of this is that resource allocation can be optimized in the RAN.

Optional examples of the TCP sending node include any of a TCP proxy node, a TCP server and a mobile device.

As an option, the method comprises determining a second minimum required bit rate for a second data stream containing a different data type.

According to a second aspect, there is provided a TCP sending node for use in a communications network. The TCP sending node is provided with a processor arranged to determine a minimum required bit rate for a data stream sent towards a TCP receiving node via a Radio Access Network. The processor is further arranged to determine that a sending bit rate of the data stream must be reduced using a TCP congestion avoidance mechanism. The processor is arranged to then apply the congestion avoidance mechanism to adjust a congestion window size such that the sending bit rate is no lower than the minimum required bit rate. A transmitter is provided for sending towards the TCP receiving node the data stream at the sending bit rate.

As an option, the processor is further arranged to determine the minimum required bit rate on the basis of the type of data.

The processor is optionally further arranged to determine the type of data by performing a packet inspection on a data packet. Examples of types of packet inspection include header classification, shallow inspection, deep packet inspection and heuristic analysis.

The TCP sending node is optionally provided with a receiver for receiving from a network analysis node a message, the message including the minimum required bit rate.

As an option, the TCP sending node is provided with a second transmitter arranged to send towards a node in the Radio Access Network a further message, the further message including any of the minimum required bit rate for the data stream, the reduced bit rate for the data stream, and a predicted bit rate for the data stream.

According to a third aspect, there is provided a network analysis node for use in a communication network. The network analysis node is provided with a receiver for receiving a TCP data stream. A processor is provided, arranged to perform an analysis of the TCP data stream to determine a type of data contained in the data stream. The processor is further arranged to determine a minimum required bit rate for the data stream. A transmitter is provided for sending to a TCP sending node a message, the message including any of the minimum required bit rate for the data stream and information relating to the analysis of the TCP data stream.

The processor is optionally further arranged to determine the type of data contained in the data stream by performing any of header classification, shallow inspection, deep packet inspection and heuristic analysis.

According to a fourth aspect, there is provided a computer program, comprising computer readable code which, when run on a TCP sending node, causes the TCP sending node to perform the steps described above in the first aspect.

According to a fifth aspect, there is provided a computer program product comprising a non-transitory computer readable medium and a computer program as described above in the fourth aspect, wherein the computer program is stored on the computer readable medium.

DETAILED DESCRIPTION

It has been realised that a reduction in the congestion window for a data stream sent using TCP can lead to the bit rate of the data stream dropping below a level that provides an adequate QoE for the end-user. A way to address this is to set a minimum required bit rate and ensure that if the congestion window is altered, the sending bit rate does not fall below the minimum required bit rate. Note that the term "minimum bit rate" is used herein to refer to a minimum average bit rate, as the bit rate may fluctuate around an average value.

The following description refers to a TCP sending node 1 and a TCP receiving node 2. It will be appreciated that the same principles can be applied to any node that sends TCP data, such as a TCP server, a UE or a TCP proxy 5. For example, a first UE sending a TCP data stream to a second UE is a TCP sending node 1, and the second UE is a TCP receiving node 2. A TCP server sending data to a UE is a TCP sending node 1. A TCP proxy 5 sending data to a UE is a TCP sending node.

Figure 3:
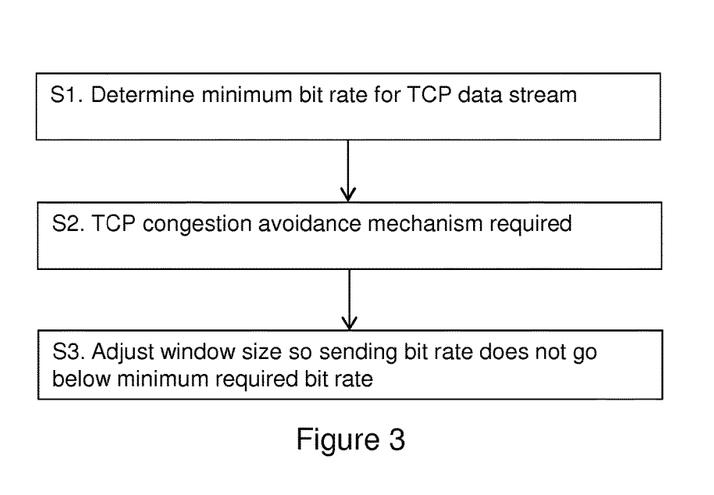
FIG. 3 is a flow diagram showing exemplary steps.

Referring to FIG. 3 herein, steps of an exemplary embodiment are shown. The following numbering corresponds to that of FIG. 3:

S1. The TCP sending node 1 determines a minimum required bit rate for a TCP data stream that ensures adequate QoE for the user at the TCP receiving node 2. There are various ways that this can be done, as discussed below.

S2. A TCP congestion avoidance mechanism is required and initiated in order to perform a back-off of the sending rate. This inevitably leads to a reduction in the TCP congestion window size.

S3. The congestion window size is adjusted such that the TCP data bit rate does not fall below the determined minimum bit rate. This ensures that the end-user's QoE is not negatively affected.

A key concept is that of the minimum required bit rate for the TCP data stream. Note that the minimum required bit-rate for TCP data streams may differ depending on the type of data being sent. For example, a high resolution live video stream needs a high minimum required bit rate to ensure that QoE is not negatively impacted. A live audio stream may need a lower minimum required bit rate. Web browsing may need a lower still minimum required bit rate. Data such as emails, which are not time-critical, may have the lowest minimum required bit rate. The type of data may be characterized by, for example, the nature of the data being sent (e.g. audio, video, web traffic etc.). Similarly, the type of data may be another parameter based on, for example, a user's subscription.

Information about the minimum required bit rate of the data may be retrieved in several ways. In an embodiment where the TCP sending node 1 hosts the data (for example, a media server), the TCP sending node 1 has full control over the bit rates supported. It is possible for different types of data to have different minimum required bit rates. Note that the TCP sending node 1 in this case may also be a cache. In this case, the TCP sending node has full knowledge of the type of data and can determined the minimum required bit rate accordingly.

Figure 4:
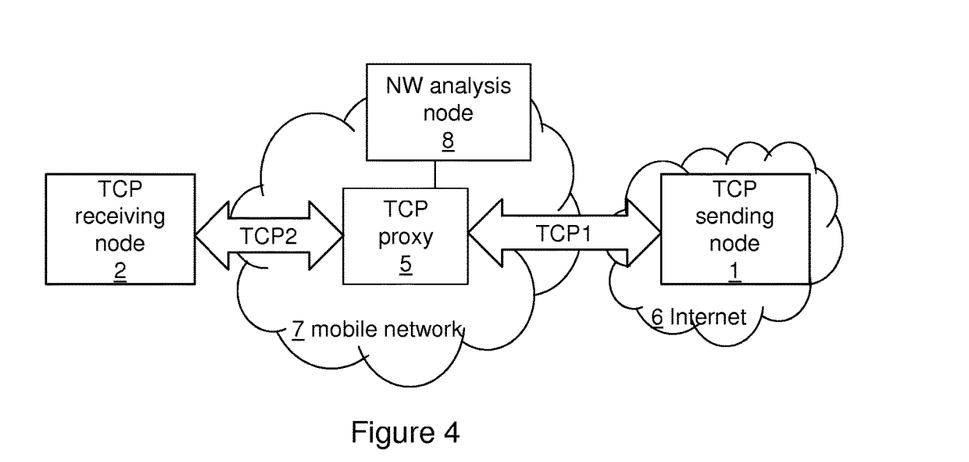
FIG. 4 illustrates schematically in a block diagram an exemplary network architecture.

In an embodiment where the TCP sending node 1 is a TCP proxy 5, the TCP sending node may not have knowledge of the type of data being sent to the TCP receiving node 2. This makes determining the minimum required bit rate more difficult. In this case, the TCP proxy 5 or a network analysis node 8, as shown in FIG. 4, can make a determination about the minimum required bit rate, and this information can be used by the TCP proxy 5.

For example, the network analysis node 8 may detect an application level negotiation about allowed bit rates. This detection, combined with knowledge about the application or service (which indicates the type of data) can give guidance towards either the correct or most probable value of the minimum required bit rate. Information about the minimum required bit rate is then provided to the TCP proxy 5. The network analysis node 8 may be located at any suitable point in the network, for example close to a gateway or located with the TCP proxy 5.

As another example, the network analysis node 8 may perform a packet inspection to detect the application level negotiation about allowed bit rates, and/or information about the application or service. Packet inspection may be combined with heuristic detection, where traffic patterns and other implicit information are used to make qualified estimations about service and media type. Measuring bit rates can be used to learn typical service behaviours. This information may be combined to determine the type of data being sent, and hence determine the minimum required bit rate.

Packet Inspection (PI) is used herein as a term for packet analysis at different levels, from a simple header classification to a deep packet inspection (DPI). By way of example, a header classification may look at the source IP address and port, the destination IP address and port, and the transport layer protocol used. Header classification is useful when traffic from certain traffic domains, e.g. the Internet or Virtual Private Networks (VPNs), is to be treated in a specific way. One example is to give all Internet traffic a certain quality of service treatment (e.g., priority). Another example is to add a different security protocol to a VPN.

A shallow inspection (also termed stateful inspection) is an analysis of a transport level protocol state, by inspecting the current protocol header (TCP, UDP etc.). For example, analyzing a sequence of TCP header flags like SYN, ACK and FIN provides information about the state of the connection. Shallow inspection is useful when link layer algorithms are triggered by sequences of events of higher layer protocol interactions, without the need of knowing what content is carried. One example of use is to decrease the user terminal battery consumption by letting lower layer protocol states follow higher layer protocol layers.

A Deep packet inspection (DPI) is an analysis of data content on the Application Layer, such as hypertext transfer protocol (HTTP) state, video frame content etc. DPI is commonly used is caching, where an HTTP request is analyzed to identify which content to fetch from the cache. Link layer algorithms can also be made to adapt to specific types of content or applications.

Heuristic detection is pattern detection or statistical identification methods performed on Application Layer data. This is typically used to classify services with encrypted content, or for applications that intentionally try to avoid identification (e.g. to avoid blocked of free voice of IP applications).

Any of the above methods of PI may be used alone or in any combination with one another.

Information about the minimum required bit rate, and/or type of data is sent from the network analysis node 8 to the TCP proxy 5 (in the case where the network analysis node 8 functionality is not provided to the TCP proxy 5). This can be done using a proprietary signalling interface, or using existing signalling protocols by piggybacking information on protocol messages. The information can also be retrieved by functionality provided at the TCP proxy 5 (the TCP proxy can per definition not retrieve the wanted information, but in this case an entity/function including both a TCP proxy and an application level proxy or packet inspection functionality is considered).

A third way to convey such information to the TCP proxy is to configure the TCP proxy 5 via the O&M system (in case the media/service/application information is available in the O&M system).

The TCP proxy 5 uses the received information to estimate or calculate the maximum allowable reduction in the congestion window size that still provides the minimum required bit rate to provide the end-user service or application without stalling or interruptions (depending on the data type). Congestion can here be congestion as detected when three duplicate acknowledgements (DUPACKs in the fast recovery phase), or more severe congestion as detected in case of a timeout. In both cases, TCP will detect congestion even where the RAN is not congested.

Figure 5:
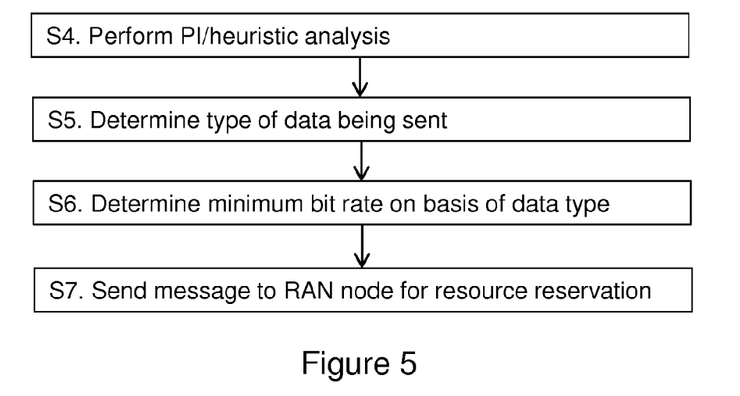
FIG. 5 is a flow diagram showing further exemplary steps.

FIG. 5 illustrates further steps in optional embodiments. This example assumes that the data type is determine by the network analysis node 8 and then provided to the TCP proxy 5 to determine the congestion window size. However, it will be appreciated that the steps of FIG. 5 may equally be performed at the TCP sending node 1, regardless of whether the sending node is a TCP server, a UE or a TCP proxy 5.

S4. DPI and/or heuristic analysis is performed by the network analysis node 8 on data traffic sent via the TCP proxy 5.

S5. The data type is determined or estimated.

S6. The minimum required bit rate is determined on the basis of the data type. This may be performed by the network analysis node 8 or by the TCP proxy 5.

S7. A message may be sent to a RAN function that provides RAN resource management. This allows the RAN resource management function to take into consideration information about the minimum required bit rate when applying scheduling and throughput limiting actions to the bearers of the TCP connections. Examples of a resource management function include a radio resource scheduler and a rate shaper. Where the resource management function and the TCP proxy 5 are synchronized, it is also possible that the media/service/application information is conveyed directly to the resource management, and the corresponding minimum bit rate as calculated in the TCP proxy 5 is also calculated at the resource management function.

Figure 6:
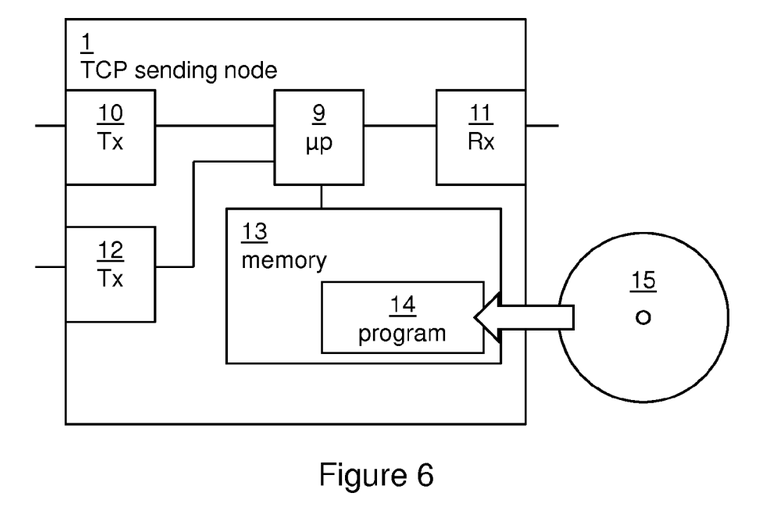
FIG. 6 illustrates schematically in a block diagram an exemplary TCP sending node.

FIG. 6 herein illustrates an exemplary TCP sending node 1. The TCP sending node 1 has a processor 9 arranged to determine the minimum required bit rate for the data stream sent towards a TCP receiving node 2. The processor 9 is also arranged to determine that the sending bit rate of the data stream must be reduced using the TCP congestion avoidance mechanism. The processor 9 is further arranged to apply the congestion avoidance mechanism to the data stream to reduce the sending bit rate to a rate no lower than the minimum required bit rate. A transmitter 10 is also provided for sending the TCP data stream towards the TCP receiving node 2 at the determined sending bit rate.

A receiver 11 may be provided for receiving information about the data type or minimum required bit rate from the network analysis node 8. As described above, this is particularly useful where the TCP sending node 1 is a TCP proxy 5. A second transmitter 12 may also be provided for sending a message towards a resource management function in the RAN, as described above in step S7. This may include the minimum required bit rate for the data stream, the reduced bit rate for the data stream, and/or a predicted bit rate for the data stream.

A non-transitory computer-readable medium in the form of a memory 13 is provided for storing a computer program 14 which, when executed by the processor 9, causes the TCP sending node to perform the steps described above. Note that the computer program 14 may be provided on an external non-transitory computer readable medium 15, such as a disk or flash drive.

Figure 7:
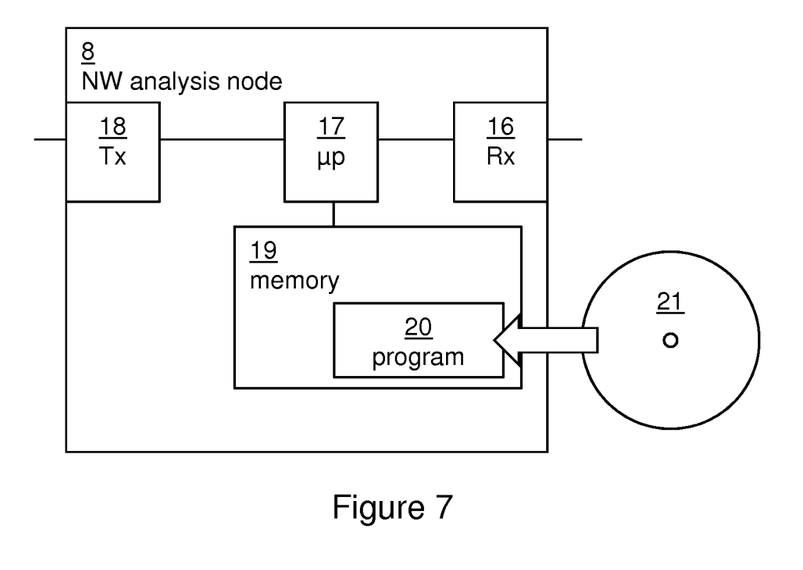
FIG. 7 is a block diagram that schematically illustrates an example network analysis node.

FIG. 7 illustrates a network analysis node 8 as described above. It is provided with a receiver 16 for receiving the TCP data stream, or data about the TCP data stream. A processor 17 is provided for performing an analysis of the TCP data stream to determine the type of data contained in the data stream. The processor 17 is further arranged to determine a minimum required bit rate for the data stream. A transmitter 18 is provided for sending a message to the TCP sending node 1. The message includes any of the minimum required bit rate for the data stream and information relating to the analysis of the TCP data stream. Note that the processor 17 may determine the type of data contained in the data stream by any of performing a packet inspection on a data packet, and by performing a heuristic analysis on the basis of any of traffic patterns and metadata associated with the data stream. This is particularly useful where the data stream is encrypted.

A non-transitory computer-readable medium in the form of a memory 19 is provided for storing a computer program 20 which, when executed by the processor 17, causes the network analysis node processor 17 to perform the steps described above. Note that the computer program 20 may be provided on an external non-transitory computer readable medium 21, such as a disk or flash drive.

The network analysis node 8 may be a stand-alone entity or may be a function provided or co-located with another node. Note also that the network analysis node may be an existing traffic node in the network that is modified to behave as described above.

Using the techniques described above, the modified TCP congestion mechanism ensures that the sending bit rate does not fall below the minimum required bit rate. The calculated minimum congestion window level takes into account the calculated minimum required bit rate and also a slope of the increasing congestion window size (configured parameter). In other words, both the minimum bit rate and the time to recover are taken into account. Congestion back-off is therefore allowed to handle any congestion, but back-off is limited to prevent a negative impact on the end-user's QoE.

While the techniques described above are most suitable for real-time data, such as streaming video and audio, they may also be applied to other types of data, such as web browser data, where a certain minimum QoE may be required. Even though this type of data is less time-critical than real-time data, the user still requires a certain level of responsiveness to provide an adequate QoE. For example, the TCP sending node 1 (or network analysis node 8) recognize that a user is web browsing, and determines that it should provide at least X kbps to make that user's experience meet a certain QoE.

The techniques described above improve end-user QoE for certain media services that are sensitive to occasional interruptions, which can happen when TCP detects congestion and decreases the throughput for a connection. Examples of services that can experience an improvement are real-time services or near-real-time services, and non-real-time video applications, although it will be appreciated that the techniques can be applied to any type of data associated with a service that has QoE requirements based on the speed of providing the data.

Where longer periods of congestion in the network are experienced, the result will be that adaptive applications are supported at the lowest bit rate that is acceptable from a quality of experience perspective.

It will be appreciated by the person of skill in the art that various modifications may be made to the embodiments described above without departing from the scope of the present invention as defined by the claims.

The following abbreviations have been used in the description:
ACK Acknowledgement
DPI Deep Packet Inspection
DUPACK Duplication Acknowledgement
HTTP Hypertext Transfer Protocol
LTE Long Term Evolution
MSS Maximum Segment Size
O&M Operation and Maintenance
PC Pipe Capacity
PGW Public Data Network Gateway
PI Packet Inspection
QoE Quality of Experience
QoS Quality of Service
RAN Radio Access Network
RTT Round Trip Time
SACK Selective Acknowledgement
TCP Transmission Control Protocol
UE User Equipment
VPN Virtual Private Networks

The invention claimed is:

1. A method of controlling a Transmission Control Protocol (TCP) congestion window size for data sent from a TCP sending node in a communications network towards a TCP receiving node via a Radio Access Network, the method comprising the TCP sending node:
receiving a message from a network analysis node, the message comprising a minimum required bit rate for a data stream sent towards the TCP receiving node;
determining the minimum required bit rate for the data stream sent towards the TCP receiving node from the message;
determining that a sending bit rate of the data stream must be reduced using a TCP congestion avoidance mechanism; and
applying the congestion avoidance mechanism to adjust the congestion window size such that the sending bit rate is no lower than the minimum required bit rate.

2. The method of claim 1, further comprising the TCP sending node determining the minimum required bit rate based on a type of data in the data stream.

3. The method of claim 2, further comprising the TCP sending node determining the type of data by performing a packet inspection on a data packet.

4. The method of claim 3, wherein the packet inspection is selected from any of header classification, shallow inspection, deep packet inspection, and heuristic analysis.

5. The method of claim 1, further comprising sending a further message towards a node in the Radio Access Network, the further message including any of the minimum required bit rate for the data stream, the reduced bit rate for the data stream, and a predicted bit rate for the data stream.

6. The method of claim 1, wherein the TCP sending node is any of a TCP proxy node, a TCP server, and a mobile device.

7. The method of claim 1, further comprising the TCP sending node determining a second minimum required bit rate for a second data stream containing a different data type.

8. A Transmission Control Protocol (TCP) sending node for use in a communications network, the TCP sending node comprising:
a processing circuit configured to:
receive a message from a network analysis node, the message comprising a minimum required bit rate for a data stream sent towards the TCP receiving node via a Radio Access Network;
determine, from the message, the minimum required bit rate for the data stream sent towards the TCP receiving node via the Radio Access Network;
determine that a sending bit rate of the data stream must be reduced using a TCP congestion avoidance mechanism;
apply the congestion avoidance mechanism to adjust a congestion window size such that the sending bit rate is no lower than the minimum required bit rate; and
a transmitter configured to send, towards the TCP receiving node, the data stream at the sending bit rate.

9. The TCP sending node of claim 8, wherein the processing circuit is configured to determine the minimum required bit rate based on a type of data in the data stream.

10. The TCP sending node of claim 9, wherein the processing circuit is configured to determine the type of data by performing a packet inspection on a data packet.

11. The TCP sending node of claim 9, wherein the processing circuit is configured to perform packet inspection by performing any of header classification, shallow inspection, deep packet inspection, and heuristic analysis.

12. The TCP sending node of claim 8, further comprising a second transmitter configured to send a further message towards a node in the Radio Access Network, the further message including any of the minimum required bit rate for the data stream, the reduced bit rate for the data stream, and a predicted bit rate for the data stream.

13. The TCP sending node of claim 8, wherein the TCP sending node is any of a TCP proxy node, a TCP server, and a mobile device.

14. A network analysis node for use in a communication network, the network analysis node comprising:
a receiver configured to receive a Transmission Control Protocol (TCP) data stream;
a processing circuit configured to:
perform an analysis of the TCP data stream to determine a type of data contained in the data stream;
determine a minimum required bit rate for the data stream; and
a transmitter configured to send a message to a TCP sending node, the message including any of the minimum required bit rate for the data stream and information relating to the analysis of the TCP data stream.

15. The network analysis node of claim 14, wherein the processing circuit is configured to determine the type of data contained in the data stream by performing any of header classification, shallow inspection, deep packet inspection, and heuristic analysis.

16. A non-transitory computer readable medium storing a computer program product for controlling a Transmission Control Protocol (TCP) congestion window size for data sent from a TCP sending node in a communications network towards a TCP receiving node via a Radio Access Network, the computer program product comprising software instructions which, when run on processing circuit of the TCP sending node, causes the TCP sending node to:

receive a message from a network analysis node, the message comprising a minimum required bit rate for a data stream sent towards the TCP receiving node;

determine the minimum required bit rate for the data stream sent towards the TCP receiving node from the message;

determine that a sending bit rate of the data stream must be reduced using a TCP congestion avoidance mechanism; and apply the congestion avoidance mechanism to adjust the congestion window size such that the sending bit rate is no lower than the minimum required bit rate.

* * * * *